US011194096B2

(12) United States Patent
Chen et al.

(10) Patent No.: US 11,194,096 B2
(45) Date of Patent: Dec. 7, 2021

(54) POLARIZATION CONVERTER BASED ON TAKING HIGH-ORDER TE MODE AS TRANSITION MODE

(71) Applicant: WUHAN RESEARCH INSTITUTE OF POSTS AND TELECOMMUNICATIONS, Hubei (CN)

(72) Inventors: Daigao Chen, Hubei (CN); Xi Xiao, Hubei (CN); Lei Wang, Hubei (CN); Ying Qiu, Hubei (CN); Miaofeng Li, Hubei (CN); Lei Liu, Hubei (CN); Qi Yang, Hubei (CN); Shaohua Yu, Hubei (CN)

(73) Assignee: WUHAN RESEARCH INSTITUTE OF POSTS AND TELECOMMUNICATIONS, Hubei (CN)

( * ) Notice: Subject to any disclaimer, the term of this patent is extended or adjusted under 35 U.S.C. 154(b) by 218 days.

(21) Appl. No.: 16/066,100

(22) PCT Filed: Dec. 7, 2016

(86) PCT No.: PCT/CN2016/108955
§ 371 (c)(1),
(2) Date: Jun. 26, 2018

(87) PCT Pub. No.: WO2017/114118
PCT Pub. Date: Jul. 6, 2017

(65) Prior Publication Data
US 2019/0018193 A1    Jan. 17, 2019

(30) Foreign Application Priority Data

Dec. 30, 2015 (CN) .......................... 201511007000.5

(51) Int. Cl.
*G02B 6/14* (2006.01)
*G02B 27/28* (2006.01)
(Continued)

(52) U.S. Cl.
CPC ............... *G02B 6/14* (2013.01); *G02B 6/126* (2013.01); *G02B 6/12014* (2013.01);
(Continued)

(58) Field of Classification Search
CPC .......... G02B 6/14; G02B 6/12; G02B 6/1204; G02B 6/16; G02B 6/42; G02B 6/126;
(Continued)

(56) References Cited

U.S. PATENT DOCUMENTS

| 6,580,850 B1* | 6/2003 | Kazarinov | ......... G02B 6/12004 385/16 |
| 2016/0178841 A1* | 6/2016 | Oka | ......... G02B 6/126 385/11 |
| 2016/0178842 A1* | 6/2016 | Goi | ......... G02B 6/126 385/11 |

\* cited by examiner

*Primary Examiner* — Jie Lei
(74) *Attorney, Agent, or Firm* — Houtteman Law LLC

(57) ABSTRACT

A polarization converter based on taking a high-order TE mode as a transition mode comprises a ridge waveguide (1) and a slab waveguide (2) that are arranged in double layers and varying in width, and a strip waveguide (4) which is varying in width. The ridge waveguide (1) is disposed on the upper end face of the slab waveguide (2), and is aligned with two ends of the slab waveguide (2). The right end of the ridge waveguide (1) and the slab waveguide (2) are connected with the strip waveguide (4) with the varying width. A $TM_0$ mode enters from the left ends of the ridge waveguide and the slab waveguide, and is converted into a $TE_0$ mode for output. On the contrary, the $TE_0$ mode enters from the right end of the strip waveguide and is converted into the $TM_0$ mode for output.

16 Claims, 2 Drawing Sheets

(51) Int. Cl.
*G02B 6/12* (2006.01)
*G02B 6/27* (2006.01)
*G02B 6/126* (2006.01)

(52) U.S. Cl.
CPC ........... *G02B 6/2766* (2013.01); *G02B 27/28* (2013.01); *G02B 27/286* (2013.01); *G02B 6/274* (2013.01); *G02B 2006/12097* (2013.01); *G02B 2006/12147* (2013.01); *G02B 2006/12152* (2013.01)

(58) Field of Classification Search
CPC .................. G02B 6/2766; G02B 6/274; G02B 2006/12097; G02B 2006/12147; G02B 2006/12152; G02B 27/28; G02B 27/286
USPC ......... 359/483.01, 34, 489, 497; 385/28, 16, 385/89, 43, 44, 49, 50
See application file for complete search history.

POLARIZATION CONVERTER BASED ON TAKING HIGH-ORDER TE MODE AS TRANSITION MODE

FIELD OF THE INVENTION

The present invention relates to a polarization converter, and more particularly, to a polarization converter based on taking a high-order TE mode as a transition mode.

BACKGROUND OF THE INVENTION

The polarization converter is an important device for polarization division multiplexing in optical communication. Currently used polarization converters may be generalized into two kinds: polarization converters of the first kind employ waveguides having a cross-section resembling an "L" shape or similar shapes to achieve direct conversion between the $TM_0$ mode and the $TE_0$ mode; polarization converters of the second kind employ inverted T-shaped waveguides to achieve conversion between the $TM_0$ mode and the $TE_1$ mode, and then, the $TE_1$ mode is converted into the $TE_0$ mode using an asymmetric Mach-Zehnder interferometer (MZI) or a directional coupler. Currently, there are the following problems:

1. The making of L-shaped waveguides, which directly achieve conversion between the $TM_0$ mode and the $TE_0$ mode, has extremely high demands on the precision of alignment machining; consequently, such devices are small in tolerance, and the yield can't be ensured;

2. As for inverted T-shaped waveguides connected with an asymmetric MZI, as devices are large in number, the designing work is inevitably faced with greater difficulties, and meanwhile, the connection of multiple devices will produce additional insertion losses and lead to reduction in bandwidth; as for inverted T-shaped waveguides connected with a directional coupler, as the directional coupler would be sensitive to band gaps between two waveguides, demands on machining precision are also high, and the yield is low.

In view of the foregoing, it would be desirable to provide a polarization converter based on taking a high-order TE mode as a transition mode so as to solve the above problems.

SUMMARY OF THE INVENTION

It is an object of the present invention to solve the problems of high demands on machining precision, great difficulty in design and low yields existing in the prior polarization converters, and the present invention provides a polarization converter based on taking a high-order TE mode as a transition mode.

In order to achieve the above object, the technical solution adopted in the present invention is as follows: a polarization converter based on taking a high-order TE mode as a transition mode, wherein the polarization converter taking a high-order even-order TE mode as a transition mode comprises a ridge waveguide and a slab waveguide which are arranged in double layers, asymmetric in width and varying in width, and a strip waveguide which is symmetric or asymmetric in width and varying in width, wherein the ridge waveguide is disposed on an upper end of the slab waveguide, and is aligned with two ends of the slab waveguide; the polarization converter taking a high-order odd-order TE mode as a transition mode comprises a ridge waveguide and a slab waveguide which are arranged in double layers, symmetric or asymmetric in width and varying in width, and a strip waveguide which is asymmetric in width and varying in width, the ridge waveguide is disposed on an upper end of the slab waveguide, and is aligned with two ends of the slab waveguide; a $TM_0$ mode enters from an entrance port formed at the left ends of the ridge waveguide and the slab waveguide, and is converted into a high-order TE mode after passing through the ridge waveguide and the slab waveguide, wherein the high-order TE mode exits from an exit port formed at the right ends of the ridge waveguide and the slab waveguide, and is then inputted into the strip waveguide, and after passing through the strip waveguide, the high-order TE mode is converted into a $TE_0$ mode for output;

on the contrary, the $TE_0$ mode enters from an entrance port formed at the right end of the strip waveguide, and is converted into a high-order TE mode after passing through the strip waveguide, the high-order TE mode exits from an exit port at the left end of the strip waveguide, and is then inputted into the ridge waveguide and the slab waveguide; after passing through the ridge waveguide and the slab waveguide, the high-order TE mode is converted into a $TM_0$ mode and outputted from an exit port formed at the left ends of the ridge waveguide and the slab waveguide.

The polarization converter as described above, wherein the requirements for the symmetry of each partial waveguide are different between the polarization converters using the high-order even-order TE mode as the transition mode and the polarization converters using the high-order odd-order TE mode as the transition mode.

The polarization converter as described above, wherein the polarization converter taking a high-order even-order TE mode as a transition mode requires the ridge waveguide and the slab waveguide must be width asymmetrical waveguides, and that the stripe waveguide must be a width-symmetrical or asymmetrical waveguide.

The polarization converter as described above, wherein the high-order odd-order TE mode polarization converter requires the ridge waveguide and the slab waveguide must be width-symmetrical or asymmetrical waveguides, and that the ridge waveguide and the slab waveguide are both width-symmetrical or non-simultaneously non-uniform, and that symmetrical, the waveguide must be a width-asymmetric waveguide.

The polarization converter as described above, wherein as for the polarization converter taking a high-order even-order TE mode as a transition mode, both the ridge waveguide and the slab waveguide can be formed by sequentially connecting and combining a plurality of asymmetric waveguide sections having different width change rates or a single section asymmetric waveguide with varying smoothly width; ends of the ridge waveguide are aligned respectively with ends of the slab waveguide, and the ends of the ridge waveguide are equivalent correspondingly to the ends of the slab waveguide in width; the width of the ridge waveguide, except at the left and right ports, should be smaller than the width of the slab waveguide.

The polarization converter as described above, wherein as for the polarization converter taking a high-order even-order TE mode as a transition mode, the strip waveguide can be formed by sequentially connecting and combining a plurality of asymmetric waveguide sections having different width change rates or a single section asymmetrical waveguide with varying smoothly width.

The polarization converter as described above, wherein as for the polarization converter taking a high-order odd-order TE mode as a transition mode, both the ridge waveguide and the slab waveguide can be formed by sequentially connecting and combining a plurality of symmetric or asymmetric waveguide sections having different width change rates or independent symmetric or asymmetric waveguide sections varying smoothly in width; ends of the ridge waveguide are aligned respectively with ends of the slab waveguide, and the ends of the ridge waveguide are equivalent correspondingly to the ends of the slab waveguide in width; the width of the ridge waveguide, except at the left and right ports, should be smaller than the width of the slab waveguide.

The polarization converter as described above, wherein as for the polarization converter taking a high-order odd-order TE mode as a transition mode, the strip waveguide can be formed by sequentially connecting and combining a plurality of asymmetric waveguide sections having different width change rates or an independent asymmetric waveguide section varying smoothly in width.

The polarization converter as described above, wherein a sum of the heights of the slab waveguide and the ridge waveguide is equivalent to the height of the strip waveguide.

The polarization converter as described above, wherein the polarization converter further comprises a transition section waveguide disposed among the ridge waveguide, the slab waveguide and the strip waveguide, wherein the transition section waveguide is a trapezoidal or straight waveguide having a length ranging from 0 to an arbitrary value.

The present invention has the following beneficial effects: the polarization converter of the present invention, which is based on taking a high-order TE mode as a transition mode, employs the ridge waveguide and the slab waveguide, which are arranged in double layers, to achieve the high-efficiency conversion between the $TM_0$ mode and the $TE_1$ mode; then, the strip waveguide which is symmetric or asymmetric in width and varying in width is employed to achieve the high-efficiency conversion between the high-order TE mode and the $TE_0$ mode, thereby finally achieving the high-efficiency conversion between $TM_0$ and $TE_0$ polarization states; the technological complexity is low, the tolerance is large, and the yield is high.

BRIEF DESCRIPTION OF THE ACCOMPANYING DRAWINGS

Figure 1:
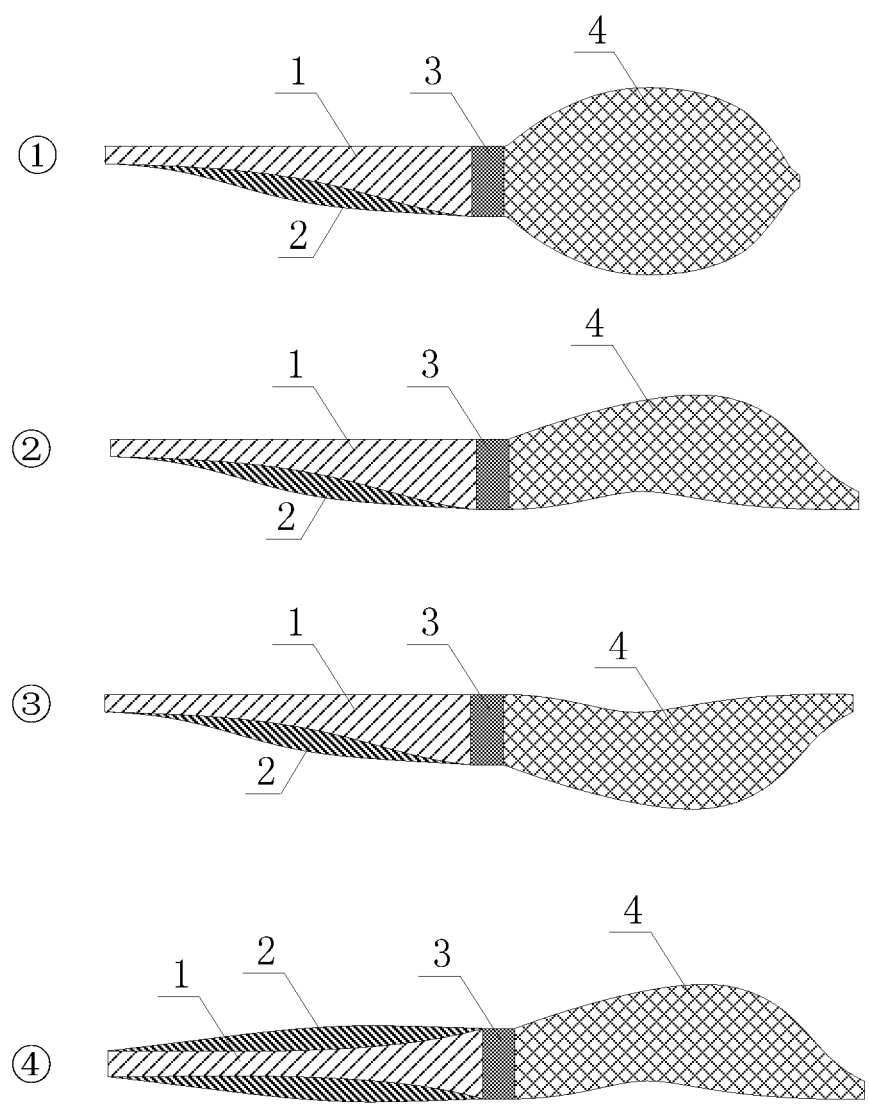
FIG. 1 is a top view of the present invention, wherein three structures as indicated by reference numerals ①, ② and ③ may be used in a polarization converter using a high-order even-order TE mode as a transition mode, and three structures as indicated by reference numerals ②, ③ and ④ may be used in a polarization converter using a high-order odd-order TE mode as a transition mode.

Reference numerals in the drawings are illustrated as follows: 1. ridge waveguide; 2. slab waveguide; 3. transition section waveguide; 4. strip waveguide.

DETAILED DESCRIPTION OF THE PREFERRED EMBODIMENTS

In order to provide a better understanding of the present invention, the contents of the present invention will be further illustrated below in combination with embodiments, but they should not be limited only to the embodiments illustrated below. Various changes or modifications may be made to the present invention by those skilled in the art, and these equivalents also fall within the range as defined by the claims listed in the present application.

As shown in FIG. 1, the present invention provides a polarization converter based on taking a high-order TE mode as a transition mode, wherein the polarization converter taking a high-order even-order TE mode as a transition mode comprises a ridge waveguide 1 and a slab waveguide 2 which are arranged in double layers, asymmetric in width and tapering in width, a strip waveguide 4 which is symmetric or asymmetric in width and varying in width, and a transition section waveguide 3 for connecting together the ridge waveguide 1, the slab waveguide 2 and the strip waveguide 4; and the polarization converter taking a high-order odd-order TE mode as a transition mode comprises a ridge waveguide 1 and a slab waveguide 2 which are arranged in double layers, symmetric or asymmetric in width and tapering in width, a strip waveguide 4 which is asymmetric in width and varying in width, and a transition section waveguide 3 for connecting together the ridge waveguide 1, the slab waveguide 2 and the strip waveguide 4. In all of the structures, the ridge waveguide 1 is disposed on an upper end of the slab waveguide 2, and aligned with two ends of the slab waveguide 2. A $TM_0$ mode enters from an entrance port formed at the left ends of the ridge waveguide 1 and the slab waveguide 2, and passes through the ridge waveguide 1 and the slab waveguide 2. Somewhere in the waveguides, as evolution modes of the $TM_0$ mode and the high-order TE mode almost have the same mode field distribution, mode mixing occurs, which promotes the mutual conversion of the two evolution modes. As such, the $TM_0$ mode is converted into the high-order TE mode in the end, and then, the high-order TE mode exits from an exit port formed at the right ends of the ridge waveguide 1 and the slab waveguide 2, and is then inputted into the strip waveguide 4. The transition section waveguide 3 is disposed between the exit port and the strip waveguide 4, and stabilization processing of the high-order TE mode is achieved within the transition section waveguide 3.

The ridge waveguide 1 and the slab waveguide 2 widen gradually, and except at the left and right ports where the two waveguides are equivalent in width, the width of the slab waveguide 2 is greater than that of the ridge waveguide 1 elsewhere. Both the ridge waveguide 1 and the slab waveguide 2 can be formed by connecting together a plurality of trapezoidal waveguide sections or independent waveguide sections varying smoothly in width.

After stabilization processing is achieved within the transition section waveguide 3, the high-order TE mode enters the strip waveguide 4. The strip waveguide 4 may be formed by connecting together a plurality of trapezoidal waveguide sections or an independent waveguide section varying smoothly in width. Generally, the waveguide widens first, and then, it is narrowed down to a width close to or equal to that of a single-mode waveguide.

Figure 2:
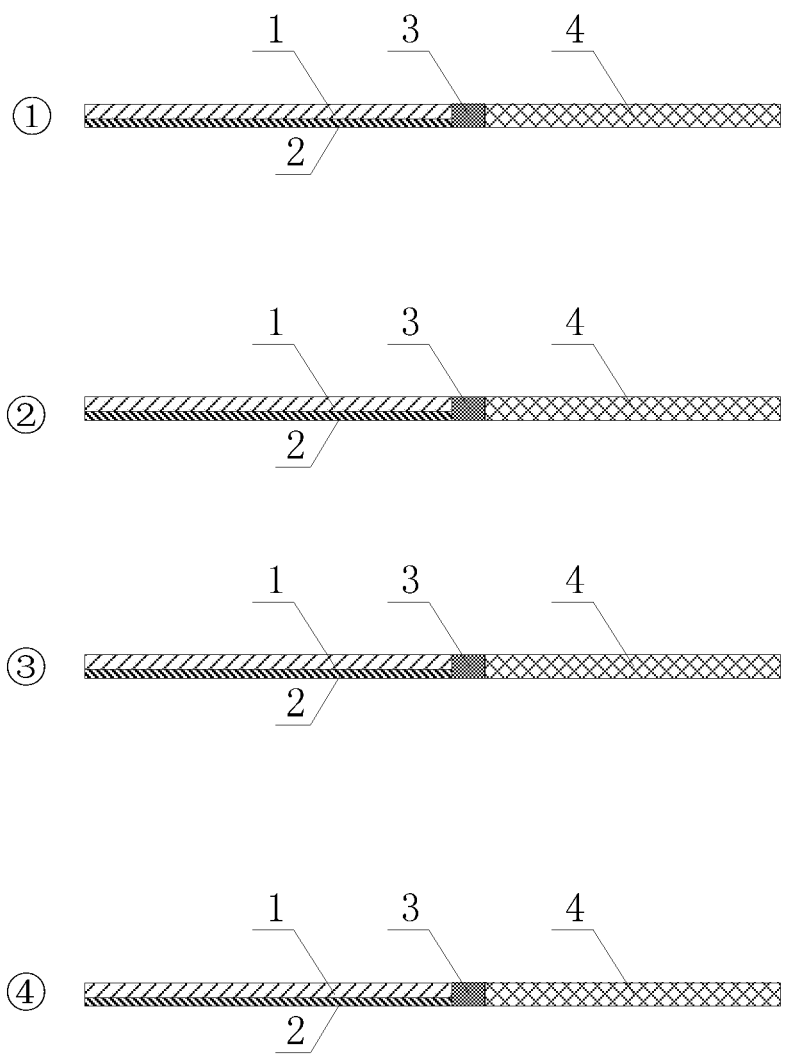
FIG. 2 is a side view of the present invention in which reference numerals correspond to those of FIG. 1.

In combination with FIGS. 1 and 2, in the present invention, the sum of the heights of the ridge waveguide 1 and the slab waveguide 2 is equivalent to the height of the strip waveguide 4. Therefore, when seen from the side, the upper surface of the ridge waveguide 1 is parallel to that of the strip waveguide 4.

Within the strip waveguide 4, wavefronts of the high-order TE mode experience different paths at various areas, and finally, these wavefronts reach phase coherence at the exit port. Then, the high-order TE mode is converted into the $TE_0$ mode and outputted from the right port of the waveguide 4, thereby achieving the high-efficiency conversion between $TM_0$ and $TE_0$ polarization states.

On the contrary, if a $TE_0$ mode enters from the right port of the strip waveguide 4, after it passes through the strip waveguide 4, wavefronts of the $TE_0$ mode experience different paths at various areas, and finally, these wavefronts reach the phase distribution of the mode field of a corresponding high-order TE mode at the left port of the strip waveguide 4. Then, the $TE_0$ mode is converted into the high-order TE mode, and outputted from the left port of the strip waveguide 4. Thereafter, the high-order TE mode passes into the transition section waveguide 3, which, after being stabilized therein, enters the ridge waveguide 1 and the slab waveguide 2. Somewhere in the waveguides, as evolution modes of the high-order TE mode and the $TM_0$ mode almost have the same mode field distribution, mode mixing occurs, which promotes the mutual conversion of the two evolution modes. Eventually, after passing through the ridge waveguide 1 and the slab waveguide 2, the high-order TE mode is converted into the $TM_0$ mode for output.

It should be noted that the transition section waveguide 3 is an unessential waveguide, which may be a trapezoidal or straight waveguide having a length ranging from 0 to an arbitrary value.

In the present invention, the polarization converter taking a high-order even-order TE mode as a transition mode employs the ridge waveguide 1 and the slab waveguide 2 which are arranged in double layers, asymmetric in width and varying in width to achieve the conversion between the $TM_0$ mode and the high-order even-order TE mode; then, the strip waveguide 4 which is symmetric or asymmetric in width and varying in width is employed to achieve the conversion between the high-order even-order TE mode and the $TE_0$ mode, thereby finally achieving the high-efficiency conversion between $TM_0$ and $TE_0$ polarization states; the polarization converter taking a high-order odd-order TE mode as a transition mode employs the ridge waveguide 1 and the slab waveguide 2 which are arranged in double layers, symmetric or asymmetric in width and varying in width to achieve the conversion between the $TM_0$ mode and the high-order odd-order TE mode; then, the strip waveguide 4 which is asymmetric in width and varying in width is employed to achieve the conversion between the high-order odd-order TE mode and the $TE_0$ mode, thereby finally achieving the high-efficiency conversion between $TM_0$ and $TE_0$ polarization states. The present invention is featured by low technological complexity, a large tolerance and a high yield.

The contents in the description that are not described in detail belong to the prior art known to those skilled in the art.

The invention claimed is:

1. A polarization converter based on taking a high-order TE mode as a transition mode, wherein the high-order TE mode comprises a high-order even-order TE mode and a high-order odd-order TE mode, wherein the polarization converter taking the high-order even-order TE mode as a transition mode comprises a ridge waveguide and a slab waveguide which are arranged in double layers, asymmetric in width direction and varying in width, and a strip waveguide which is symmetric or asymmetric in width direction and varying in width, the ridge waveguide is disposed on an upper surface of the slab waveguide, and is aligned with two ends of the slab waveguide; the polarization converter taking the high-order odd-order TE mode as a transition mode comprises a ridge waveguide and a slab waveguide which are arranged in double layers, symmetric or asymmetric in width direction and varying in width, and a strip waveguide which is asymmetric in width direction and varying in width, the ridge waveguide is disposed on an upper surface of the slab waveguide, and is aligned with two ends of the slab waveguide;

wherein the polarization converter taking the high-order even-order TE mode as the transition mode requires that the ridge waveguide and the slab waveguide are asymmetric waveguides in width direction, and that the stripe waveguide is a symmetric waveguide in width direction;

wherein the polarization converter taking the high-order odd-order TE mode as the transition mode requires that the ridge waveguide and the slab waveguide are symmetric waveguides in width direction, and the ridge waveguide and the slab waveguide are both symmetric in width direction at the same time, and that the strip waveguide is an asymmetric waveguide in width direction;

wherein the ridge waveguide and the slab waveguide widen gradually from the end away from the strip waveguide to the end close to the strip waveguide, ends of the ridge waveguide are equivalent correspondingly to ends of the slab waveguide in width; the width of the ridge waveguide, except at the end ports, is smaller than the width of the slab waveguide; the strip waveguide widens first and then narrows from the end close to the ridge waveguide to the end away from the ridge waveguide;

a $TM_0$ mode enters from an entrance port formed at the ends away from the strip waveguide of the ridge waveguide and the slab waveguide, and is converted into a high-order TE mode after passing through the ridge waveguide and the slab waveguide, wherein the high-order TE mode exits from an exit port formed at the ends close to the strip waveguide of the ridge waveguide and the slab waveguide, and is then inputted into the strip waveguide, and after passing through the strip waveguide, the high-order TE mode is converted into a $TE_0$ mode for output;

on the contrary, the $TE_0$ mode enters from an entrance port formed at the end away from the ridge waveguide of the strip waveguide, and is converted into a high-order TE mode after passing through the strip waveguide, the high-order TE mode exits from an exit port at the end close to the ridge waveguide of the strip waveguide, and is then inputted into the ridge waveguide and the slab waveguide; after passing through the ridge waveguide and the slab waveguide, the high-order TE mode is converted into a $TM_0$ mode and outputted from an exit port formed at the ends away from the strip waveguide of the ridge waveguide and the slab waveguide.

2. The polarization converter according to claim 1, wherein as for the polarization converter taking the high-order even-order TE mode as the transition mode, both the ridge waveguide and the slab waveguide can be formed by sequentially connecting and combining a plurality of asymmetric waveguide sections having different width change rates or an independent asymmetric waveguide section with varying smoothly width.

3. The polarization converter according to claim 1, wherein as for the polarization converter taking the high-order even-order TE mode as the transition mode, the strip waveguide can be formed by sequentially connecting and combining a plurality of asymmetric waveguide sections having different width change rates or an independent asymmetrical waveguide section with varying smoothly width.

4. The polarization converter according to claim 1, wherein as for the polarization converter taking the high-order odd-order TE mode as the transition mode, both the ridge waveguide and the slab waveguide can be formed by sequentially connecting and combining a plurality of symmetric or asymmetric waveguide sections having different width change rates or an independent symmetric or asymmetric waveguide section varying smoothly in width.

5. The polarization converter according to claim 1, wherein as for the polarization converter taking the high-order odd-order TE mode as the transition mode, the strip waveguide can be formed by sequentially connecting and combining a plurality of asymmetric waveguide sections having different width change rates or an independent asymmetric waveguide section varying smoothly in width.

6. The polarization converter according to claim 1, wherein a sum of the heights of the slab waveguide and the ridge waveguide is equivalent to the height of the strip waveguide.

7. The polarization converter according to claim 1, wherein the polarization converter further comprises a transition section waveguide disposed among the ridge waveguide, the slab waveguide and the strip waveguide, wherein the transition section waveguide is a trapezoidal or straight waveguide having a length ranging from 0 to an arbitrary value.

8. The polarization converter according to claim 1, wherein as for the polarization converter taking the high-order even-order TE mode as the transition mode, both the ridge waveguide and the slab waveguide can be formed by sequentially connecting and combining a plurality of asymmetric waveguide sections having different width change rates or an independent asymmetric waveguide section with varying smoothly width.

9. The polarization converter according to claim 1, wherein as for the polarization converter taking the high-order even-order TE mode as the transition mode, both the ridge waveguide and the slab waveguide can be formed by sequentially connecting and combining a plurality of asymmetric waveguide sections having different width change rates or an independent asymmetric waveguide section with varying smoothly width.

10. The polarization converter according to claim 1, wherein as for the polarization converter taking the high-order even-order TE mode as the transition mode, the strip waveguide can be formed by sequentially connecting and combining a plurality of asymmetric waveguide sections having different width change rates or an independent asymmetrical waveguide section with varying smoothly width.

11. The polarization converter according to claim 1, wherein as for the polarization converter taking the high-order even-order TE mode as the transition mode, the strip waveguide can be formed by sequentially connecting and combining a plurality of asymmetric waveguide sections having different width change rates or an independent asymmetrical waveguide section with varying smoothly width.

12. The polarization converter according to claim 1, wherein as for the polarization converter taking the high-order odd-order TE mode as the transition mode, both the ridge waveguide and the slab waveguide can be formed by sequentially connecting and combining a plurality of symmetric or asymmetric waveguide sections having different width change rates or an independent symmetric or asymmetric waveguide section varying smoothly in width.

13. The polarization converter according to claim 1, wherein as for the polarization converter taking the high-order odd-order TE mode as the transition mode, both the ridge waveguide and the slab waveguide can be formed by sequentially connecting and combining a plurality of symmetric or asymmetric waveguide sections having different width change rates or an independent symmetric or asymmetric waveguide section varying smoothly in width.

14. The polarization converter according to claim 1, wherein as for the polarization converter taking the high-order odd-order TE mode as the transition mode, the strip waveguide can be formed by sequentially connecting and combining a plurality of asymmetric waveguide sections having different width change rates or an independent asymmetric waveguide section varying smoothly in width.

15. The polarization converter according to claim 1, wherein as for the polarization converter taking the high-order odd-order TE mode as the transition mode, the strip waveguide can be formed by sequentially connecting and combining a plurality of asymmetric waveguide sections having different width change rates or an independent asymmetric waveguide section varying smoothly in width.

16. A polarization converter based on taking a high-order TE mode as a transition mode, wherein the high-order TE mode comprises a high-order even-order TE mode and a high-order odd-order TE mode, wherein the polarization converter taking the high-order even-order TE mode as a transition mode comprises a ridge waveguide and a slab waveguide which are arranged in double layers, asymmetric in width direction and varying in width, and a strip waveguide which is symmetric or asymmetric in width direction and varying in width, the ridge waveguide is disposed on an upper surface of the slab waveguide, and is aligned with two ends of the slab waveguide; the polarization converter taking the high-order odd-order TE mode as a transition mode comprises a ridge waveguide and a slab waveguide which are arranged in double layers, symmetric or asymmetric in width direction and varying in width, and a strip waveguide which is asymmetric in width direction and varying in width, the ridge waveguide is disposed on an upper surface of the slab waveguide, and is aligned with two ends of the slab waveguide;

wherein the polarization converter taking the high-order even-order TE mode as the transition mode requires that the ridge waveguide and the slab waveguide are asymmetric waveguides in width direction, and that the stripe waveguide is an asymmetric waveguide in width direction;

wherein the polarization converter taking the high-order odd-order TE mode as the transition mode requires that the ridge waveguide and the slab waveguide are asymmetric waveguides in width direction, and the ridge waveguide and the slab waveguide are both asymmetric in width direction at the same time, and that the strip waveguide is an asymmetric waveguide in width direction;

wherein the ridge waveguide and the slab waveguide widen gradually from the end away from the strip waveguide to the end close to the strip waveguide, ends of the ridge waveguide are equivalent correspondingly to ends of the slab waveguide in width;

the width of the ridge waveguide, except at the end ports, is smaller than the width of the slab waveguide; the strip waveguide widens first and then narrows from the end close to the ridge waveguide to the end away from the ridge waveguide;

a $TM_0$ mode enters from an entrance port formed at the ends away from the strip waveguide of the ridge waveguide and the slab waveguide, and is converted into a high-order TE mode after passing through the ridge waveguide and the slab waveguide, wherein the high-order TE mode exits from an exit port formed at the ends close to the strip waveguide of the ridge waveguide and the slab waveguide, and is then inputted into the strip waveguide, and after passing through the strip waveguide, the high-order TE mode is converted into a $TE_0$ mode for output;

on the contrary, the $TE_0$ mode enters from an entrance port formed at the end away from the ridge waveguide of the strip waveguide, and is converted into a high-order TE mode after passing through the strip waveguide, the high-order TE mode exits from an exit port at the end close to the ridge waveguide of the strip waveguide, and is then inputted into the ridge waveguide and the slab waveguide; after passing through the ridge waveguide and the slab waveguide, the high-order TE mode is converted into a $TM_0$ mode and outputted from an exit port formed at the ends away from the strip waveguide of the ridge waveguide and the slab waveguide.

* * * * *